(12) United States Patent
Wan et al.

(10) Patent No.: US 9,840,440 B2
(45) Date of Patent: Dec. 12, 2017

(54) HYDROPHOBIC LOW SHRINKAGE LIGHTWEIGHT CEMENTITIOUS MATRIX

(71) Applicant: Nano and Advanced Materials Institute Limited, Hong Kong (HK)

(72) Inventors: Kai Tai Wan, Hong Kong (HK); Honggang Zhu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 263 days.

(21) Appl. No.: 14/549,568

(22) Filed: Nov. 21, 2014

(65) Prior Publication Data

US 2015/0152011 A1 Jun. 4, 2015

Related U.S. Application Data

(60) Provisional application No. 61/963,282, filed on Nov. 29, 2013.

(51) Int. Cl.
| | | |
|---|---|---|
| *C04B 28/14* | (2006.01) | |
| *C04B 28/06* | (2006.01) | |
| C04B 111/34 | (2006.01) | |
| C04B 111/40 | (2006.01) | |

(52) U.S. Cl.
CPC .............. *C04B 28/14* (2013.01); *C04B 28/065* (2013.01); *C04B 2111/34* (2013.01); *C04B 2111/40* (2013.01); *Y02W 30/94* (2015.05)

(58) Field of Classification Search
CPC ......... C04B 28/28; C04B 24/04; C04B 14/28; C04B 14/10; C04B 16/02
See application file for complete search history.

(56) References Cited

U.S. PATENT DOCUMENTS

| | | | |
|---|---|---|---|
| 3,565,648 A | | 2/1971 | Mori et al. |
| 3,753,749 A | * | 8/1973 | Nutt ...................... C04B 18/241 |
| | | | 106/731 |
| 4,659,385 A | * | 4/1987 | Costopoulos .......... C04B 26/04 |
| | | | 106/673 |
| 5,641,584 A | | 6/1997 | Andersen et al. |
| 6,875,266 B1 | * | 4/2005 | Naji ........................ C04B 28/02 |
| | | | 106/724 |
| 7,410,538 B2 | * | 8/2008 | Butler ..................... C04B 24/42 |
| | | | 106/2 |

(Continued)

FOREIGN PATENT DOCUMENTS

| | | |
|---|---|---|
| CN | 101239837 A | 8/2008 |
| WO | 1999028264 A1 | 6/1999 |
| WO | 2012162292 A2 | 11/2012 |

OTHER PUBLICATIONS

First Office Action with search report issued by the State Intellectual Property Office of China dated Oct. 10, 2016.

*Primary Examiner* — Paul D Marcantoni
(74) *Attorney, Agent, or Firm* — Spruson & Ferguson (HK)

(57) ABSTRACT

The present invention provides a composition for forming a lightweight, low shrinkage and hydrophobic cementitious matrix, and a method for preparing thereof. The present cementitious matrix formed by the composition is lightweight, hydrophobic (or water repelling) and with low shrinkage which is useful in building and construction industry as non-structural wall resistant to water, heat and sound entry. The present invention also provides a method of preparing the composition and the cementitious matrix formed from the composition.

17 Claims, 4 Drawing Sheets

(56) References Cited

U.S. PATENT DOCUMENTS

| | | |
|---|---|---|
| 8,172,937 B2 | 5/2012 | Masloff et al. |
| 8,445,560 B2 | 5/2013 | Lecomte et al. |
| 2002/0117086 A1 | 8/2002 | Shi et al. |
| 2012/0312193 A1* | 12/2012 | Jezequel ................ C04B 28/04 106/678 |

* cited by examiner

HYDROPHOBIC LOW SHRINKAGE LIGHTWEIGHT CEMENTITIOUS MATRIX

CROSS REFERENCE TO RELATED APPLICATIONS

The present application claims priority of U.S. provisional patent application Ser. No. 61/963,282 filed Nov. 29, 2013, and the disclosure of which is incorporated herein by reference in its entirety.

FIELD OF THE INVENTION

The present invention relates to a composition for forming a lightweight, low shrinkage and hydrophobic cementitious matrix and a method for preparing thereof. The present cementitious matrix formed by the composition is lightweight, hydrophobic (or water repelling) and with low dry shrinkage which is useful as non-structural wall or panel or block for thermal and/or acoustic insulation and is resistant to water.

BACKGROUND OF THE INVENTION

In residential and commercial buildings, most energy is spent to regulate the temperature inside the enclosure. Significant portion of energy is wasted by heat exchange through the envelope of enclosure. Conventionally, the envelope of enclosure is made of reinforced concrete. Albeit concrete is known as thermal insulating material, significant amount of heat is transferred through the wall, which is comparable to windows and open doors and it is not satisfactory to achieve the requirement of current green building standards on the thermal resistance of building envelope without extra enlargement over the structural and durability design requirements. It is possible, but not economical, to enlarge the element of building envelope with conventional concrete material to enhance the thermal resistance, which adds extra loads on foundations as well as load bearing elements. An alternative approach is to provide lightweight material with high thermal resistance to form the building envelope.

Expanded polystyrene (EPS) shows a good balance among the thermal resistance, strength and self weight. However, it is flammable and thereby fire can widely spread easily on its surface. In addition, toxic gas is released upon its thermal decomposition. Hence, it is prohibited to be used in buildings.

On the other hand, cement-based material is inorganic, durable and with excellent fire resistance. To enhance the thermal resistance of conventional cement-based material, the density is reduced by incorporating light-weight aggregates or air voids into the cement-based matrix. Lightweight aggregates include expanded clay, vermiculite, expanded perlite, hollow glass bead, etc, which can significantly reduce the density and hence increase the thermal resistance. For example, U.S. Pat. No. 5,641,584 disclosed a highly insulative cementitious matrixes, wherein lightweight aggregate is included to reduce the density and enhance the thermal insulation. However, the cost of lightweight cementitious composite made of lightweight aggregates is always significantly increased.

Another method to produce lightweight cement-based material is to incorporate air voids into the cementitious matrix and it is known as foamed concrete, aerated concrete or cellular concrete. There are mainly two groups of foaming methods for foamed concrete production. One is the chemical foaming method, while the other is the physical foaming method.

Regarding the chemical foaming method, chemicals, which can react in alkaline environment and release gas, are added to form an air void system inside cementitious matrix and reduce the density. Examples of such chemicals are aluminum powder, zinc powder, calcium carbide, hydrogen peroxide, magnesium peroxide and potassium manganite, etc. According to the curing way of foamed concrete after air void formation, the foamed concrete made with chemical foaming method could be classified to be autoclaved aerated concrete and non-autoclaved aerated concrete. Regarding the autoclaved aerated concrete, it normally contains 0.05-0.08 vol. % of aluminum powder which react with calcium hydroxide in cementitious matrix to form hydrogen gas. After hardening, the foamed concrete is cut and autoclaved at steamed environment of about 190 degree Celsius under pressure of 8-12 bars to achieve its full strength in a short term, saying 10-12 hours. The size of each member produced with this method is limited by the volume of the autoclaved chamber. While for the non-autoclaved aerated concrete, hydrogen peroxide which reacts under alkaline environment and releases oxygen gas is always added, and the foamed concrete produced are always cured under normal atmospheric pressure and room temperature. This method hence provides an economical way to produce lightweight cement-based material with high scalability. However, one problem of the chemical foaming method is that the rate of gas released highly depends on temperature and pH of the cement-based material in fresh state and hence, it is difficult to control the density of final product.

To overcome the high sensitivity to temperature and pH change when adding chemical to produce air voids, physical foaming method can be employed. The physical foam can be generated by mixing the foaming agent (surfactant), high pressure water and compressed air in a foam generation machine, and then mixed into the wet cementitious matrix. With this method, the density of foam generated can be measured and hence the density of the final product of lightweight cement-based material can be well controlled. The physical foam can also be induced by introducing gas directly or by introducing surfactant (synthetic) or protein foaming agent into the wet cementitious matrix, however, the density of foamed concrete made using this method is difficult to be controlled, as the volume of air voids formed highly depends on the rheology of wet cementitious matrix and the mixing way.

There are a lot of air voids, either open cell or closed cell, included and distributed in the foamed concrete, the thermal resistance and sound absorption capability of foamed concrete is hence high, but on the other hand, the moisture and/or water could hence be able to penetrate into foamed concrete easily, especially when the air void content is high and/or the open cell content is high. The thermal resistance and sound absorption capability of foamed concrete will degrade when water penetrates, accumulates and fills the air voids included in the foamed concrete. To reduce the ease of water absorption of foamed concrete, one approach is to make the cementitious matrix of foamed concrete, which is generally hydrophilic in nature, become hydrophobic, namely water repelling.

Shrinkage of concrete is the reduction in volume at constant temperature without external loading. And, it is an important material property that has significant effects on the long-term performance of designed structures, as serious shrinkage will lead to serious cracks in the concrete elements. Shrinkage can be classified into autogeneous shrinkage, drying shrinkage and carbonation shrinkage. Autogeneous shrinkage refers to volume changes caused by the hydration of cement. Drying shrinkage is resulted from the drying of cement and concrete materials. Carbonation shrinkage occurs when the hydration products of cement react with $CO_2$ in the environment. As a result of the low content of aggregate, high content of reactive cementitious materials, and high content of air-voids which makes both drying and carbonation more easily, foamed concrete always shows a much higher shrinkage, saying 1-2 times, than the normal concrete. This large shrinkage will lead to serious cracks in foamed concrete elements, especially when reinforcements are embedded, which is harmful to both the insulation performance and durability of foamed concrete elements.

Lecomte, et al., U.S. Pat. No. 8,445,560 disclosed a granulated hydrophobing additive for rendering cementitious materials hydrophobic, wherein the hydrophobing additive comprises an organosilicon component and a binder polymer deposited on a particulate carrier so as to form a film. They also disclosed a cementitious material in powder form comprising dry cement and the granulated hydrophobing additive and a process for imparting to cementitious material a hydrophobic character. However, they did not provide the detailed composition of the cementitious materials and the detail of the process.

Shi, et al., US 2002/0117086 A1, disclosed a low shrinkage, high strength cellular lightweight concrete. However, a unique chemical admixture, shrinkage reducing agent, is required for such concrete to achieve low shrinkage.

It would hence be desirable to provide a lightweight cementitious matrix with both hydrophobic and low shrinkage characters, which have not been achieved by those presently available.

SUMMARY OF THE INVENTION

Accordingly, the first aspect of the present invention relates to a composition for forming the cementitious matrix of the present invention, which comprises cementitious forming material, inert filler, hydrophobic admixture, water reducing agent, viscosity modifying agent, setting time modifying agent, water, foaming agent and foam stabilizer. The cementitious forming material, inert filler and hydrophobic admixture, with careful particle size selection, form the powdery raw materials. More particularly, the cementitious forming material includes one or more of ordinary Portland cement, calcium sulfoaluminate cement, ground granulated blast-furnace slag, microsilica, gypsum (hemi-hydrate and dihydrate), calcined magnesium oxide and pulverized fuel ash; the inert filler includes limestone powder, crushed stone fines and silica sand; the water reducing agent includes sulfonate and polycarboxylate based water reducing agent; the viscosity modifying agent includes methylcellulose and hydroxypropyl methylcellulose; the setting time controlling agent includes citric acid, tartaric acid, boric acid, purified lignosulfonate, calcium formate, lithium carbonate and calcium chloride etc. The hydrophobic admixture is used to enhance the hydrophobicity and water repelling performance of the cementitious matrix. The cementitious matrix formed by the composition added with the hydrophobic admixture becomes hydrophobic or water-repelling, with the contact angle of water on any face of the cementitious matrix not less than 90 degrees. The hydrophobic admixture used in the present invention includes surface-treated clay material. As the hydrophobic admixture could reduce the surface tension of water, the hydrophobic admixture used in the present invention is also used as the foam stabilizer, or the foam stabilizer can be any surfactant or chemicals which can reduce the surface tension of water, such as carboxymethyl cellulose, polyvinyl alcohol, pregelatinized starch, cellulose ether, silicon surfactant and hydrophobized inorganic particles, etc. The foaming agent used in the present invention which has the same properties can also serve as the foam stabilizer of the present invention A second aspect of the present invention relates to a method of preparing the cementitious matrix using the composition of the present invention. To form the composition of the cementitious matrix, different components of the cementitious forming material, inert filler and hydrophobic admixture as described herein are mixed in dry form until the dry powder is uniform. At the same time, the water reducing agent, viscosity modifying agent, and setting time controlling agent are added into water to form a solution mixture. The solution mixture is then added to the uniform dry powder and mixed until the mixture is uniform to form a uniformly wet mixed mortar. For foam stabilizers except for the hydrophobic admixtures and foaming agent of the present invention, they will be mixed in dry form if they are incompatible with water for example the hydrophobized inorganic particles, or added into water if they are compatible with water for example the cellulose ether, carboxymethyl cellulose and pregelatinized starch.

To reduce the density of the uniformly wet mixed mortar, air voids are induced by either (i) physical foaming or (ii) chemical foaming. Regarding to the physical foaming, foam can be induced by adding surfactant (synthetic) or protein foaming agent, or by introducing gas, or by adding dry foam generated from surfactant (synthetic) or protein foaming agent combined with compressed air and pressurized water using foam generator, into the wet mortar. As regards to the chemical foaming, foaming agent which can react in alkaline environment and release gas can be added to the wet mortar to induce air voids formation. The foaming agent to be added includes hydrogen peroxide, potassium manganite, calcium carbide, and magnesium peroxide.

It is noteworthy that the composition of the cementitious matrix of the present invention is elaborately designed to achieve lightweight, hydrophobic and low shrinkage. First, a carefully selected hydrophobic admixture is included to make the cementitious matrix showing hydrophobic or water repelling character, without complicating the preparing process and significantly degrading the other properties of the cementitious matrix. This is also beneficial to the carbonation shrinkage reduction of the matrix, as water is required for carbonation reaction while the hydrophobic character will inhibit the water absorption of the matrix. To further reduce the shrinkage, calcium sulfoaluminate cement, gypsum (hemi-hydrate and dihydrate) and calcined magnesium oxide are included as they will form volume expansion product in the hydration reaction; ground granulated blast-furnace slag, microsilica, and pulverized fuel ash are included as they will reduce the dry shrinkage by reducing the usage of water, and reduce the carbonation shrinkage via consuming part of calcium hydroxide in the reaction; inert filler are also introduced to replace part of cementitious forming materials and hence to reduce the autogeneous shrinkage of the cementitious matrix; and inclusion of the water reducing agent, which could reduce the amount of water used without degrading the workability of the wet mortar, is also beneficial to the reduction of dry shrinkage. The foam size, foam distribution and foam stability are three key factors to make high quality foamed lightweight cementitious matrix. Viscosity modifying agent is employed to adjust the viscosity of wet mortar to control the size of foam and enhance the uniform distribution and stability of foam; setting time modifying agent is introduced to adjust the setting time of wet mortar to control the volume of air voids generated and reduce the chance of coalescence of air bubbles; and the stability of foam is further enhanced by introducing the foam stabilizer. On the other hand, notwithstanding which foaming method is used, the particle size distribution of powdery raw materials (including the cementitious forming material, inert filler and hydrophobic admixture) of the cementitious matrix is of key importance to the foam size and stability of the present cementitious matrix. In order to achieve this goal, the desired particle size of the powdery raw materials is below 150 μm, more preferably is from 20 to 100 μm. Particle size within this range can facilitate the formation of air voids in the cementitious matrix with sufficiently small size and sufficiently high stability. The small size of air voids in the cementitious matrix also benefits to the shrinkage reduction. To ensure the powdery raw materials of the cementitious matrix having the desired particle size distribution, careful particle size distribution design and careful particle size selection are required to be conducted for powdery raw materials.

DETAILED DESCRIPTION OF THE INVENTION

Figure 1:
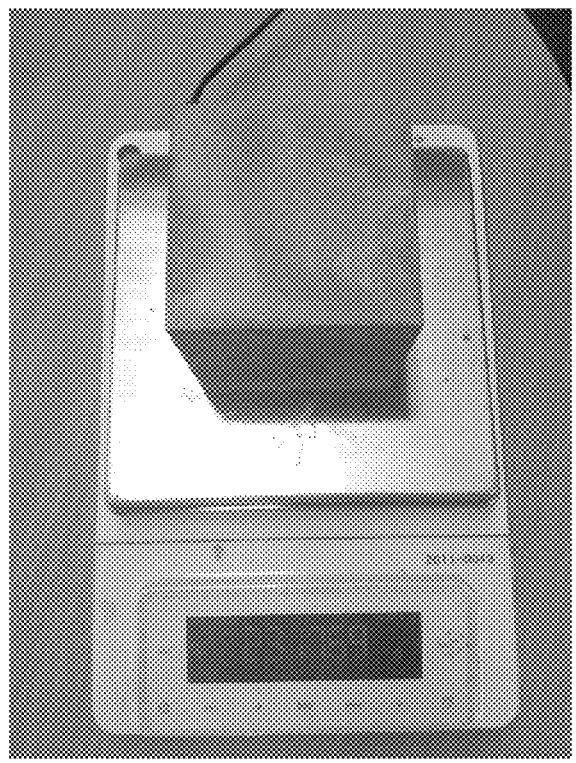
FIG. 1 shows a photo of a conventional (normal) concrete block.

Reference will now be made in detail to the presently preferred embodiment of the present invention, serve to explain the principles of the invention. These embodiments or examples are described in sufficient detail to enable those skilled in the art to practice the invention, and it is to be understood that other embodiments may be utilized, and that changes may be made without departing from the spirit of the present invention.

EXAMPLES

General Composition for Forming the Cementitous Matrix

The cementitious matrix formed by the present composition and method exhibits lightweight, low shrinkage and hydrophobic characteristics. To achieve this goal, the present cementitious matrix combines all essential properties of lightweight foamed concrete. In general, the composition forming the cementitious matrix of the present invention comprises: from 1 to 95 volume percentage cementitious forming material including from 0 to 80 volume percentage ordinary Portland cement, from 1 to 80 volume percentage calcium sulfoaluminate cement, from 0-75 volume percentage ground granulated blast-furnace slag, from 0 to 15 volume percentage microsilica, from 0 to 10 volume percentage calcined magnesium oxide where the calcined magnesium oxide is calcined for 0.5 to 3 hours at 800 to 950 degree Celsius, from 0 to 10 volume percentage gypsum (hemihydrate and dihydrate) and from 0 to 50 volume percentage pulverized fuel ash; from more than 0 to 20 volume percentage inert filler including limestone powder with mean particle size between 20 and 80 microns, crushed stone fines and silica sand; from 0.001 to 1.5 wt. % water reducing agent to the total weight of the powdery raw materials, such as polycarboxylate and sulfonate salt; from 0.001 to 0.1 wt. % viscosity modifying agent to the total weight of the powdery raw materials, such as hydroxypropyl methylcellulose; from 0.01 to 2 wt. % setting time controlling agent to the total weight of the powdery raw materials, such as boric acid and tartaric acid; from 10 to 50 wt. % water to the total weight of the powdery raw materials, and from 0.001 to 10 wt. % foaming agent to the total weight of the powdery raw materials, such as hydrogen peroxide, potassium permanganate, magnesium peroxide and synthetic or protein foaming agent, or from 1 to 90 volume percentage dry foam or gas. To improve the water resistance, from 1 to 20 wt. % hydrophobic admixture of the total weight of the powdery raw materials, such as surface treated clay material is added. The cementitious forming materials, hydrophobic admixture and inert filler are first mixed in dry form until the dry powder is uniform to form powdery raw materials. At the same time, water reducing agent, viscosity modifying agent, setting time controlling agent are added into water to form a solution mixture. The solution mixture is then added to the uniformly mixed powdery raw materials and mixed until the mixture is uniform. Regarding foam stabilizers except for the hydrophobic admixtures and foaming agent of the present invention, they will be mixed in dry form if they are incompatible with water for example the hydrophobized inorganic particles, or added into water if they are compatible with water for example the cellulose ether, carboxymethyl cellulose and pregelatinized starch.

Figure 2:
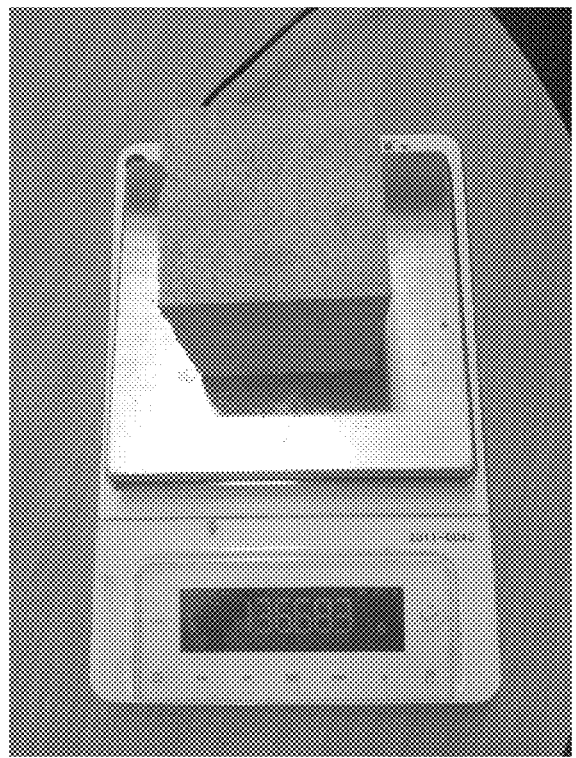
FIG. 2 shows a photo of a lightweight cementitious matrix according to an embodiment of the present invention.
Figure 3:
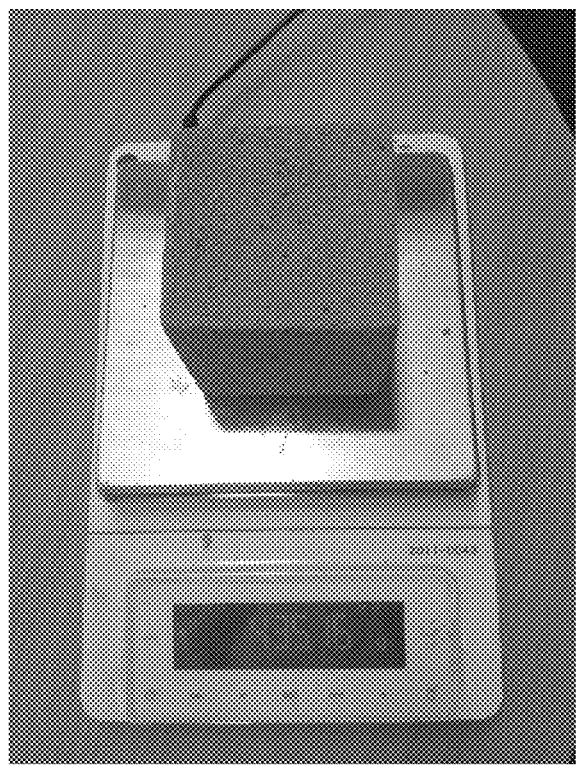
FIG. 3 shows a photo of an ultra-lightweight cementitious matrix according to an embodiment of the present invention.
Figure 4:
FIG. 4 shows a photo of a lightweight cementitious matrix floatable on water according to an embodiment of the present invention.
Figure 5:
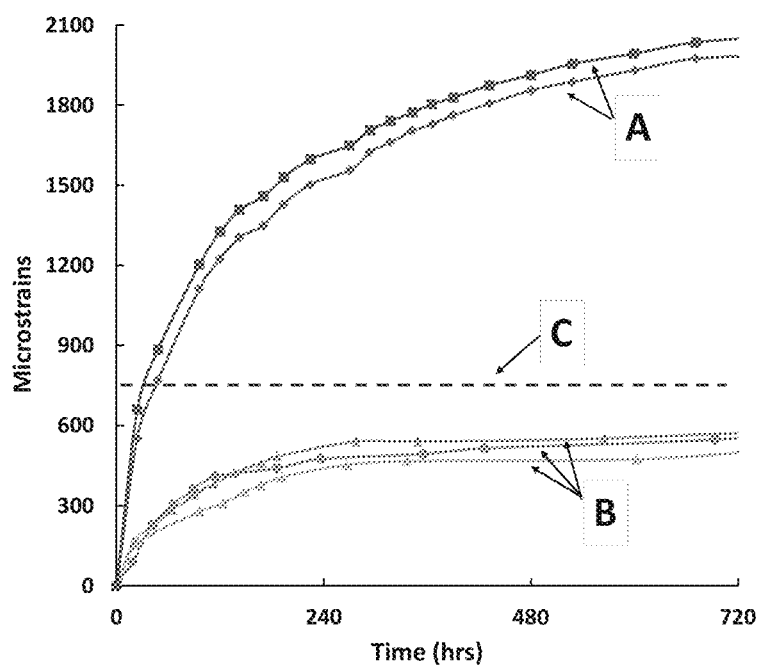
FIG. 5 is a graph showing the change in microstrains over a time course (28 days) for (A) a conventional foamed concrete and for (B) the cementitious matrix according to an embodiment of the present invention; (C) is the maximum shrinkage of conventional (normal) concrete.
Figure 6:
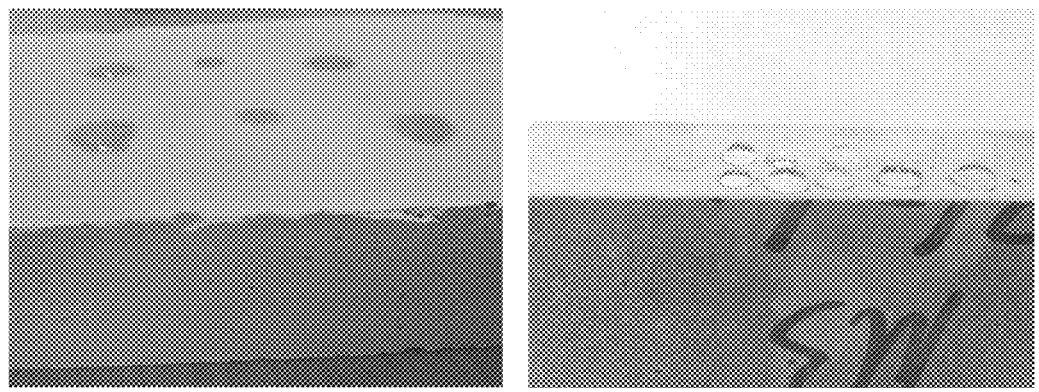
FIG. 6 shows photos of water spread on surface of (A) conventional concrete block and (B) present cementitious matrix.

The bulk specific gravity of a conventional (normal) concrete block is about 2.3-2.4 (FIG. 1). By the present composition and method, the bulk specific gravity of the cementitious matrix can be reduced to about 1.4 (FIG. 2) with a compressive strength of about 25 MPa and thermal conductivity of about 0.4 W/m·K. The bulk specific gravity of the present cementitious matrix can be further reduced down to 0.4 (FIG. 3) with a compressive strength of about 0.5 MPa and thermal conductivity of about 0.08 W/m·K, which becomes floatable on water (FIG. 4). The reduction of the bulk specific gravity of the cementitious matrix is mainly due to the introduction of air voids. The dry shrinkage of the present cementitious matrix with the bulk specific gravity of about 1.64 (FIG. 5B) at the $28^{th}$ day is much lower than that of a conventional foamed concrete with a bulk specific gravity of about 1.6, and comparable with the maximum shrinkage (saying 800 microstrains) of a conventional (normal) concrete (FIG. 5C). To improve the water resistance, hydrophobic admixture is added so that the water contact angle is larger than 90 degrees (FIG. 6). In FIG. 6, surface treated clay-like material is used as the hydrophobic admixture.

Figure 8:
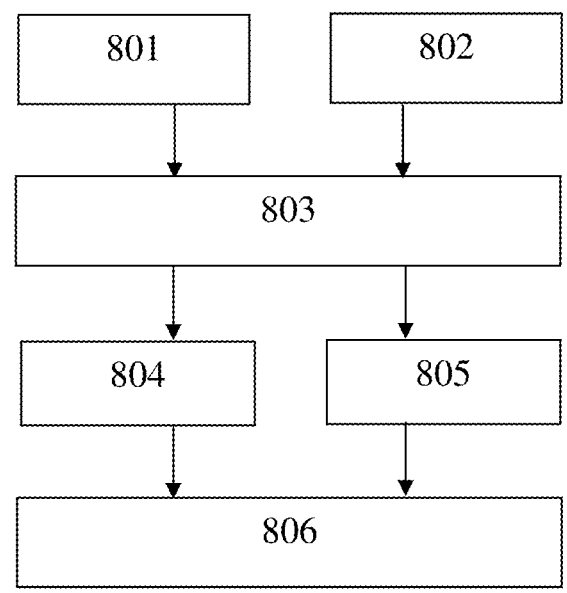
FIG. 8 is a flow chart illustrating the present method of preparing a composition for the cementitious matrix and the formation thereof.

FIG. 8 generalizes the method of preparing the composition for forming the cementitious matrix of the present invention and the formation thereof by inducing air voids therein.

To form the composition of the cementitious matrix, different components of the cementitious forming material, inert filler and hydrophobic admixture as described herein are mixed in dry form until the dry powder is uniform (801). At the same time, the water reducing agent, viscosity modifying agent, and setting time controlling agent are added into water to form a solution mixture (802). The solution mixture is then added to the uniform dry powder and mixed until the mixture is uniform to form a uniformly wet mixed mortar (803). Regarding foam stabilizers except for the hydrophobic admixtures and foaming agent of the present invention, they will be mixed in dry form (801) if they are incompatible with water or added into water (802) if they are compatible with water. To reduce the density of the uniformly wet mixed mortar, air voids are induced. Air voids can be induced by physical foaming (804) or chemical foaming (805).

Figure 7:
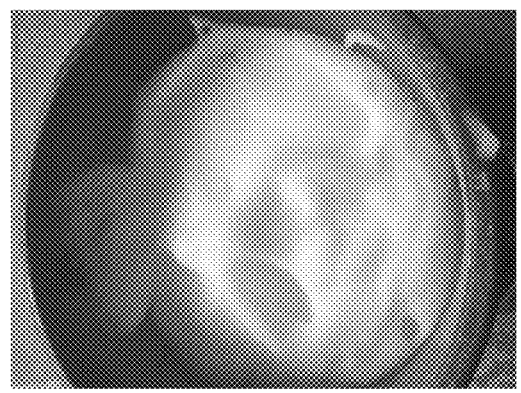
FIG. 7 shows a photo of bubble (dry foam) generated by the foam generator according to an embodiment of the present invention.

For physical foaming method (804), foaming agent, compressed air (1-3.5 bars) and pressurized water (1-3.5 bars) are mixed in a foam generator, with the mass ratio of foaming agent to water ranging from 0.001 to 0.1, and then fine bubble, namely dry foam, which is a mixture of water and air are generated (FIG. 7). Then, the foam is mixed mechanically into the wet mixed mortar. In one preferred embodiment, 15-85 volume percentage of dry foam is mixed into the wet mixed mortar, and foamed concrete with bulk specific gravity of 0.4-1.8, compressive strength of 0.5-60 MPa and thermal conductivity of 0.08-0.7 W/m·K are made. Another approach is that gas or surfactant (synthetic) foaming agent or protein foaming agent can be added into the wet mixed mortar and then, small air voids are formed by the friction induced during mixing.

For chemical foaming method (805), foaming agent (hydrogen peroxide, potassium peroxide, potassium manganite, calcium carbide) can be added in the wet mixed mortar and then, gas is released within the mortar via chemical reaction in alkaline environment.

To reduce the size of foam and stabilize the foam in the present cementitious matrix, the particle size of the powdery raw materials of the cementitious matrix should be below 150 μm. A preferred range of particle size is from 20 to 100 μm. Particle size within this range can facilitate the formation of air voids in the cementitious matrix with sufficiently small size and sufficiently high stability.

After the foaming, the cementitious matrix is formed by curing the wet mortar for not less than 2 hours at room temperature and under normal atmospheric pressure in a mould with desired size and shape (806) until it is solidified.

Example 1—Composition for Forming the Hydrophobic, Low Shrinkage and Lightweight Cementitous Matrix To fabricate a lightweight foamed concrete with bulk specific gravity of about 1.4, 290 g calcium sulfoaluminate cement, 146 g ordinary Portland cement, 450 g ground granulated blast-furnace slag, 125 g limestone powder and 253 g surface treated clay-like material are mixed first in dry form until the dry powder is uniform. At the same time, 3.17 g polycarboxylate based water reducing agent, 0.127 g hydroxypropyl methylcellulose and 3.28 g boric acid are added into 365 g water to form a solution mixture. The solution mixture is then added to the uniform dry powder and mixed until the mixture is uniform to form a uniformly wet mixed mortar. To reduce the density of the uniformly wet mixed mortar, 2.3 g protein based foaming agent are then weighed and added into the wet mixed mortar followed by continuous mixing. Air voids are then induced within the mortar by physical foaming (friction) as described herein. Lightweight foamed concrete specimens are then prepared by pouring the foamed wet mortar in moulds with desired shape and size followed by sufficient curing at room temperature and normal atmospheric pressure.

Example 2—Composition for Forming the Hydrophobic, Low Shrinkage and Lightweight Cementitous Matrix To fabricate a lightweight foamed concrete with bulk specific gravity of about 0.9, 862 g ordinary Portland cement, 52 g gypsum (hemihydrate), 1136 g ground granulated blast-furnace slag, 375 g limestone powder and 125 g surface treated clay-like material are mixed first in dry form until the dry powder is uniform. At the same time, 17.3 g polycarboxylate based water reducing agent, 0.25 g hydroxypropyl methylcellulose and 12.9 g calcium formate are added into 752 g water to form a solution mixture. The solution mixture is then added to the uniform dry powder and mixed until the mixture is uniform to form a uniformly wet mixed mortar. To reduce the density of the uniformly wet mixed mortar, dry foam with a bulk specific gravity of about 0.05 is generated by mixing the protein foaming agent, compressed air (2 bars) and pressurized water (2 bars) in a foam generator. 137 g dry foam are then weighed and mixed into the wet mortar as described herein. Lightweight foamed concrete specimens are then prepared by pouring the foamed wet mortar in moulds with desired shape and size followed by sufficient curing at room temperature and normal atmospheric pressure.

Example 3—Composition for Forming the Hydrophobic, Low Shrinkage and Ultra-Lightweight Cementitious Matrix To fabricate an ultra-lightweight foamed concrete with bulk specific gravity of about 0.4, 54 g calcium sulfoaluminate cement, 54 g ordinary Portland cement, 112 g ground granulated blast-furnace slag, 31 g limestone powder and 63 g surface treated clay-like material are mixed first in dry form until the dry powder is uniform. At the same time, 2.13 g polycarboxylate based water reducing agent, 0.031 g hydroxypropyl methylcellulose, 0.427 g tartaric acid and 0.3 g calcium stearate are added into 113 g water to form a solution mixture. The solution mixture is then added to the uniform dry powder and mixed until the mixture is uniform to form a uniformly wet mixed mortar. To reduce the density of the uniformly wet mixed mortar, 30 g hydrogen peroxide are then weighed and added into the wet mixed mortar followed by a short period, for example, 10-20 s, of continuous mixing. Lightweight foamed concrete specimens are then prepared by pouring the wet mixed mortar in moulds with desired shape and size followed by sufficient curing at room temperature and normal atmospheric pressure. In this case, air voids are gradually induced within the mortar by chemical foaming (chemical reaction) as described herein after the mortar is poured into the mould.

INDUSTRIAL APPLICABILITY

The present composition and the cementitious matrix with a low bulk specific gravity, low shrinkage and hydrophobic (or water-repelling) characters are useful in the building and construction industry for forming non-structural wall or panel or block for thermal and/or acoustic insulation.

It is understood that the method described herein may be performed in different order, concurrently and/or together with other steps not mentioned herein but readily appreciated by one skilled in the art to obtain the cementitious matrix of the present invention. Without further elaboration, it is believed that one skilled in the art can, based on the description herein, modify the present invention without departing the spirit of the present invention and utilize the present invention to its fullest extend. All publication recited herein are hereby incorporated by reference in their entirety.

What is claimed is:

1. A composition for forming lightweight, low shrinkage and hydrophobic cementitious matrix, said composition comprising from 1 to 95% by volume of cementitious forming material, inert filler including limestone powder with a mean particle size between 20 and 80 μm, and from 1 to 20% by weight of surface-treated clay material as a hydrophobic admixture which form powdery raw materials with a particle size below 150 μm, said composition further comprising water reducing agent, viscosity modifying agent, setting time modifying agent, water, foaming agent and foam stabilizer.

2. The composition of claim 1, wherein the cementitious forming material comprises one or more of ordinary Portland cement, calcium sulfoaluminate cement, ground granulated blast-furnace slag, microsilica, calcined magnesium oxide, gypsum (hemihydrate and dihydrate) and pulverized fuel ash.

3. The composition of claim 1, wherein the inert filler is in a volume percentage from more than 0% to 20% further comprising crushed stone fines and silica sand.

4. The composition of claim 1, wherein the water reducing agent in a weight percentage to the total weight of the powdery raw materials is from 0.001% to 1.5% comprising one of polycarboxylate and sulfonate water reducing agents.

5. The composition of claim 1, wherein the viscosity modifying agent in a weight percentage to the total weight of the powdery raw materials is from 0.001% to 0.1% comprising one of methylcellulose and hydroxypropyl methylcellulose.

6. The composition of claim 1, wherein the setting time controlling agent in a weight percentage to the total weight of the powdery raw materials is from 0.001% to 2% comprising one of citric acid, tartaric acid, boric acid, purified lignosulfonate, calcium formate, calcium chloride and lithium carbonate.

7. The composition of claim 1, wherein the foaming agent in a weight percentage to the total weight of the powdery raw materials is from 0.001% to 10% comprising one of surfactant (synthetic) foaming agent, protein foaming agent, hydrogen peroxide, potassium manganite, calcium carbide, and magnesium peroxide.

8. The composition of claim 1, wherein the water in a weight percentage to the total weight of the powdery raw materials is from 10% to 50%.

9. The composition of claim 2, wherein the cementitious forming material comprises from 0 to 80 volume percentage Portland cement, from 1 to 80 volume percentage calcium sulfoaluminate cement, from 0 to 75 volume percentage ground granulated blast-furnace slag, from 0 to 15 volume percentage microsilica, from 0 to 10 volume percentage calcined magnesium oxide, from 0 to 10 volume percentage gypsum (hemihydrate and dehydrate) and from 0 to 50 volume percentage pulverized fuel ash.

10. The composition of claim 1, wherein the foam stabilizer is the hydrophobic admixture or the foaming agent or any chemical that can reduce the surface tension of water.

11. The composition of claim 1, wherein the powdery raw materials have a particle size from 20 to 100 μm.

12. A cementitious matrix formed by the composition of claim 1.

13. A method of forming a cementitious matrix comprising the following steps:
  (a) preparing a powdery mixture containing powdery raw materials by mixing 1-95% vol. % cementitious forming material comprising one or more of 0-80 vol. % ordinary Portland cement, 1-80 vol. % calcium sulfoaluminate cement, 0-75 vol. % ground granulated blast-furnace slag, 0-15 vol. % microsilica, 0-10 vol. % calcined magnesium oxide which is prepared by calcining the magnesium oxide for 0.5 to 3 hours at 800 to 950 degree Celsius, 0-50 vol. % pulverized fuel ash, and 0-10 vol. % gypsum, with from more than 0 to 20 vol. % inert filler comprising limestone powder with a mean particle size between 20 and 80 μm, crushed stone fines and silica sand, and 1-20 wt. % surface treated clay material as a hydrophobic admixture, in their dry form until the mixture becomes uniform;
  (b) preparing a solution mixture by adding 0.001-1.5 wt. % water reducing agent comprising polycarboxylate or sulfonate water reducing agent to the total weight of the powdery raw materials, 0.001 to 0.1 wt. % viscosity modifying agent comprising methylcellulose and hydroxypropyl methylcellulose to the total weight of the powdery raw materials, and 0.001 to 2 wt. % setting time controlling agent comprising citric acid, tartaric acid, boric acid, purified lignosulfonate calcium formate, calcium chloride and lithium carbonate to the total weight of the powdery raw materials, into 10-50 wt. % water to the total weight of the powdery raw materials and mix them well;
  (c) adding the solution mixture prepared in (b) into the powdery mixture prepared in (a) and mix them well until a uniformly wet mixed mortar is formed;
  (d) inducing 1-90% by volume of air voids into the uniformly wet mixed mortar obtained from (c) by physical or chemical foaming, the physical foaming being carried out either by mixing the foaming agent, compressed air and pressurized water in a foam generator to generate fine bubble or by mixing gas or a surfactant (synthetic) foaming agent or protein foaming agent with the wet mixed mortar directly such that small air voids are formed by friction induced during mixing; the chemical foaming being carried out by adding a foaming agent into the wet mixed mortar such that gas is released within the wet mixed mortar in alkaline environment in order to form air voids, wherein the foaming agent used in the chemical foaming comprises hydrogen peroxide, potassium peroxide, potassium manganite and calcium carbide;
  (e) Curing the uniformly wet mixed mortar after being induced with the air voids at room temperature and under normal atmospheric pressure for at least 2 hours until the uniformly wet mixed mortar becomes solidified in a mould.

14. A cementitious matrix comprising a uniformly wet mixed and air voids induced mortar after cured and solidified in a mould, said uniformly wet mixed and air voids induced mortar comprising:

a powdery mixture containing powdery raw materials having a particle size less than 150 μm well mixed with a solution mixture and induced with 1-90% by volume of said air voids, wherein said powdery mixture is prepared by mixing 1-95 vol. % cementitious forming material comprising one or more of 0-80 vol. % ordinary Portland cement, 1-80 vol. % calcium sulfoaluminate cement, 0-75 vol. % ground granulated blast-furnace slag, 0-15 vol. % microsilica, 0-10 vol. % calcined magnesium oxide which is prepared by calcining the magnesium oxide for 0.5 to 3 hours at 800 to 950 degree Celsius, 0-50 vol. % pulverized fuel ash, and 0-10 vol. % gypsum, with from more than 0% to 20 vol. % inert filler including limestone powder with a mean particle size between 20 and 80 μm, crushed stone fines and silica sand, and 1-20 wt. % hydrophobic surface treated clay material as a hydrophobic admixture, in their dry form until the mixture becomes uniform;

said solution mixture is prepared by adding 0.001-1.5 wt. % water reducing agent comprising one of polycarboxylate or sulfonate water reducing agent to the total weight of the powdery raw materials, 0.001 to 0.1 wt. % viscosity modifying agent comprising one of methylcellulose and hydroxypropyl methylcellulose to the total weight of the powdery raw materials, and 0.001 to 2 wt. % setting time controlling agent comprising one of citric acid, tartaric acid, boric acid, purified lignosulfonate, calcium formate, calcium chloride and lithium carbonate to the total weight of the powdery raw materials, into 10-50 wt. % water to the total weight of the powdery raw materials to mix well;

said air voids are induced into the mixture of said powdery mixture and said solution mixture by physical or chemical foaming, the physical foaming being carried out either by mixing the foaming agent, compressed air and pressurized water in a foam generator to generate fine bubble or by mixing gas or a surfactant (synthetic) foaming agent or protein foaming agent with the wet mixed mortar directly such that small air voids are formed by friction induced during mixing; the chemical foaming being carried out by adding a foaming agent into the wet mixed mortar such that gas is released within the wet mixed mortar in alkaline environment in order to form air voids, wherein the foaming agent used in the chemical foaming comprises hydrogen peroxide, potassium peroxide, potassium manganite and calcium carbide.

15. The cementitious matrix of claim 14, wherein 290 g calcium sulfoaluminate cement, 146 g ordinary Portland cement, 450 g ground granulated blast-furnace slag, 125 g limestone powder and 253 g surface treated clay material are mixed to form said powdery mixture; 3.17 g polycarboxylate water reducing agent, 0.127 g hydroxypropyl methylcellulose and 3.28 g boric acid are added into 365 g water to form said solution mixture; 2.3 g protein foaming agent are added into the mixture of said powdery mixture and said solution mixture followed by continuous mixing for inducing said air voids by friction during said mixing; after said uniformly wet mixed and air voids induced mortar is cured and solidified in the mould, a lightweight foamed concrete with bulk specific gravity of about 1.4 is formed.

16. The cementitious matrix of claim 14, wherein 862 g ordinary Portland cement, 52 g gypsum (hemihydrate), 1,136 g ground granulated blast-furnace slag, 375 g limestone powder and 125 g surface treated clay material are mixed to form said powdery mixture; 17.3 g polycarboxylate water reducing agent, 0.25 g hydroxypropyl methylcellulose and 12.9 calcium formate are added into 752 g water to form said solution mixture; 137 g dry foam with a bulk specific gravity of about 0.05 is generated by mixing the protein foaming agent, compressed air and pressurized water at 1-3.5 bars in a foam generator and then added into the mixture of said powdery mixture and said solution mixture; after said uniformly wet mixed and air voids induced mortar is cured and solidified in the mould, a lightweight foamed concrete with bulk specific gravity of about 0.9 is formed.

17. The cementitious matrix of claim 14, wherein the particle size of the powdery raw materials is from 20 to 100 um.

* * * * *